United States Patent [19]

Cobb, III et al.

[11] Patent Number: 5,525,768
[45] Date of Patent: Jun. 11, 1996

[54] SWITCH SYSTEM FOR MOTOR VEHICLE TRANSMISSIONS

[75] Inventors: Carleton M. Cobb, III, East Walpole, Mass.; Gary A. Baker, North Scituate, R.I.; Peter J. Bloznalis, North Attleboro, Mass.

[73] Assignee: Texas Instruments Incorporated, Dallas, Tex.

[21] Appl. No.: 390,845

[22] Filed: Feb. 17, 1995

[51] Int. Cl.⁶ .................................. H01H 9/06
[52] U.S. Cl. ............ 200/61.88; 200/11 G; 200/11 J; 200/302.1
[58] Field of Search .............. 192/89.22; 200/11 E, 200/11 EA, 11 G, 11 J, 11 K, 11 C, 61.88, 61.89, 61.91; 267/161, 162

[56] References Cited

U.S. PATENT DOCUMENTS

| | | | |
|---|---|---|---|
| 3,602,656 | 8/1971 | Graddy et al. | 200/11 C |
| 3,703,613 | 11/1972 | Abel | 200/11 TW |
| 3,939,313 | 2/1976 | Hayashi et al. | 200/11 J |
| 3,951,393 | 4/1976 | Smirl | 267/161 |
| 4,027,865 | 6/1977 | Greenwood et al. | 267/161 X |
| 4,188,146 | 2/1980 | Stecklein | 403/158 |
| 4,604,506 | 8/1986 | Gebhardt | 200/61.89 |
| 4,897,513 | 1/1990 | Oka et al. | 200/11 EA |
| 5,023,414 | 6/1991 | Mihara et al. | 200/61.91 |
| 5,099,092 | 3/1992 | Lauritsen | 200/61.91 |
| 5,191,178 | 3/1993 | Baker | 200/61.88 |
| 5,231,254 | 7/1993 | Baker et al. | 200/61.91 |
| 5,325,083 | 6/1994 | Nassar et al. | 340/456 |
| 5,338,907 | 8/1994 | Baker et al. | 200/61.88 |
| 5,440,087 | 8/1995 | Cobb, III | 200/61.88 |

Primary Examiner—J. R. Scott
Attorney, Agent, or Firm—Russell E. Baumann; Richard L. Donaldson; René E. Grossman

[57] ABSTRACT

A switch system (10) is shown having housing members (12, 13) forming a cavity (14) in which an actuator arm (32) is pivotably mounted. Spring electrical contact members (36, 38) are mounted on the actuator arm and slide into and out of engagement with electrical contact segments (26a, 24a) respectively mounted on respective circuit boards (26, 24) as the actuator arm pivots. The actuator arm is formed with a hub portion (32a) received in bores (12b, 13b) of the housing. The hub in turn has a bore (32b) which is received on and keyed to the manual shaft of a vehicle transmission by opposing flat surfaces (32c). First and second annular spring seal elements (34) are received between respective sealing surfaces (12a, 32a) and (13a, 32a) to prevent ingress of debris into cavity (14). Housing member (12) is formed with a connector portion (16) having a generally cylindrical connector shroud (16a) which receives terminal pins (28) which are electrically connected to contact segments (26a, 24a). Connector portion (16) is received through a first bore (2) of the transmission housing wall (6) and manual lever shaft (8) is received in a second bore (4) of the transmission housing wall (6).

19 Claims, 5 Drawing Sheets

SWITCH SYSTEM FOR MOTOR VEHICLE TRANSMISSIONS

FIELD OF THE INVENTION

This invention relates generally to vehicular transmissions and more particularly to electrical switches for providing an electrical signal responsive to the position of the manual shaft and detent lever associated with such transmissions.

BACKGROUND OF THE INVENTION

It is conventional to mount a rotary switch on the transmission housing externally thereof to receive mechanical gear selection inputs from the operator of a vehicle through various linkages and output gear selections to appropriate output means such as a decoder module and the transmission electronic control unit via electronic signals. The switch includes a quadrant with a selected number of electrical switch segments disposed thereon with each segment providing an output to the output means. The manual valve controlling hydraulic operation of the transmission is mechanically coupled to a plate having indexing detents, called a detent lever, mounted on a shaft and pivotably movable therewith. The shaft extends through the transmission housing wall and a switch bar is fixedly attached to the shaft externally of the transmission housing so that when a vehicle operator selects a gear the switch bar within the rotary switch moves across the quadrant to a predetermined position to engage one or more of the electrical contact segments. In certain systems the electronic control monitors the gear position along with other inputs relative to such things as throttle position, output shaft speed, engine speed, engine load and so on.

In U.S. Pat. No. 5,338,907, assigned to the assignee of the present invention, a switch system is disclosed which is mounted within the transmission housing in order to avoid placing the switches in a hostile environment subject to water splash and the like as well as to avoid tolerance stack-up problems associated with linkages employed when mounting the switches externally of the transmission housing. In that patent a switch housing is shown mounted on the manual lever shaft. The housing is coupled to a roller attached to the detent spring which biases the roller into engagement with the outer edge of the detent lever to maintain the housing stationary relative to the transmission housing. A switch arm fixedly mounted on the manual lever shaft mounts a plurality of first electrical contacts and extends into the switch housing. The switch arm, movable with the detent lever, moves into and out of engagement with respective second electrical contacts mounted on the switch housing. Although transmission fluid can enter and leave the switch housing, suitable seals are provided to prevent ingress of metal particles and other debris into the switch housing. Flexible electrical leads have one end connected to terminals of the electrical contact segments and an opposite end connected to terminals of a connector mounted in a bore provided in the wall of the transmission housing.

Although the switch operates effectively mounted within the transmission housing, a problem can occur during assembly of the transmission in that the electrical leads sometimes are chaffed, pinched or run over a sharp edge thereby causing a short circuit. This problem becomes exacerbated in many newly designed transmissions which tend to be smaller in size.

SUMMARY OF THE INVENTION

It is an object of the invention to provide an electric switch assembly responsive to gear selection free of the limitations of the above noted prior art. Another object is the provision of a switch assembly which can be accommodated within available space of existing, as well as smaller, newly designed vehicle transmission housings and which do not have wiring harnesses of flexible wires disposed within the housing. Yet another object is the provision of an electric switch assembly responsive to gear selection which is easily assembled in a vehicle transmission having improved reliability yet with sufficient accuracy to accurately track gear selection.

Other objects, advantages and details of the switch system of this invention appear in the following detailed description of the preferred embodiment of the invention.

Briefly, in accordance with the invention, a switch housing is mounted within a transmission housing of a vehicle on the manual lever shaft between the wall of the transmission housing and the detent lever. The switch housing is formed with an integral connector portion which is receivable in a bore formed in the wall of the transmission housing so that the manual lever shaft and the connector portion, respectively received through first and second bores in the transmission housing wall, fix the orientation of the housing. An actuator or switch arm is fixedly mounted on the manual lever shaft within the housing and is movable within the housing as the manual lever shaft is turned. Movable electrical contacts are mounted on the actuator arm and are biased into engagement with a circuit board disposed in the housing so that they move into and out of electrical engagement with stationary contact segments on the circuit board as the actuator arm pivots with the manual lever shaft. The contact segments are coupled to terminal pins mounted in the connector portion of the housing. The connector portion is provided with a threaded female insert used to mechanically couple a mating connector outside of the transmission housing. According to a feature of the invention, first and second annular spring seal elements are disposed on opposite sides of the actuator arm around the manual lever shaft on respective seal seats formed between the actuator arm and the housing. The seal elements are effective to prevent entry into the housing of debris which could otherwise interfere with the electrical switching operation. The seal elements are curved in the radial direction and have a selected crown height between at least one of the inner and outer edges lying in a plane to that portion of the elements furthest removed from the plane. A particularly advantageous seal element has a load vs. deflection curve which has a portion decreasing in load as the element is deflected as it approaches a flat configuration. The seal seats are formed having opposed surface portions spaced from one another a distance selected so that the seal elements are collapsed to an extent that the spring force exerted by the elements is relatively low to thereby minimize drag as the actuator arm pivots within the housing. According to a feature of the invention the seal elements are able to move laterally sufficiently to accommodate slight misalignment caused by manufacturing tolerances in machining the two bores in the transmission housing wall. According to another feature of the invention, the housing is formed of thermoplastic material, such as nylon, having first and second portions which are fixed to one another by vibration welding made possible by the ability of the seal elements to accommodate the lateral component of the vibration movement.

DESCRIPTION OF THE PREFERRED EMBODIMENT

Figure 1:
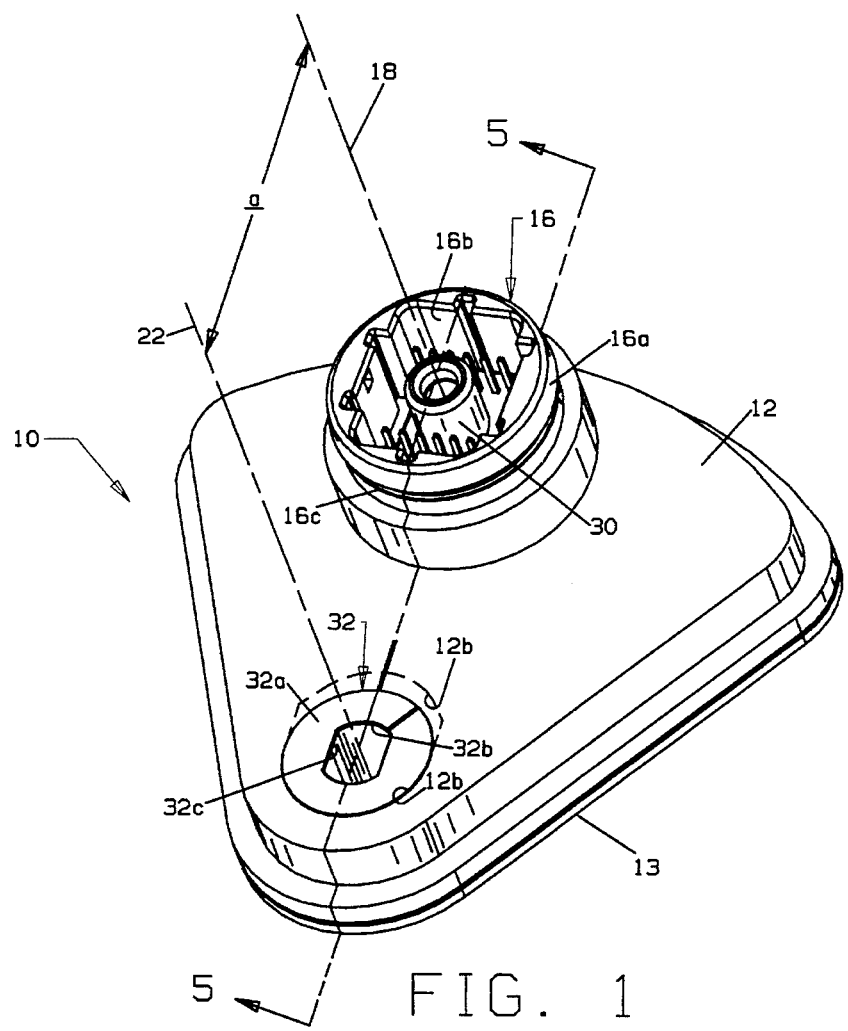
FIG. 1 is a perspective view of a switch assembly made in accordance with the invention.
Figure 2:
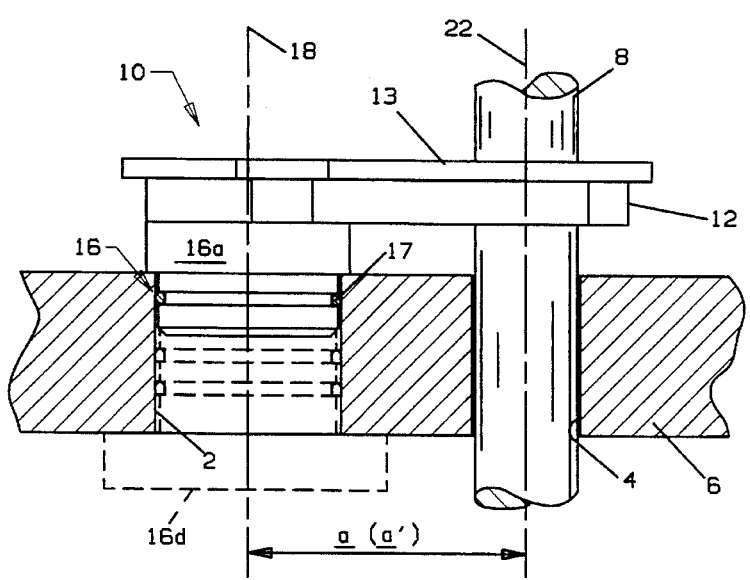
FIG. 2 is a side elevational view of the FIG. 1 switch assembly mounted within a transmission housing with the connector portion 16 facing downwardly and with the housing wall shown in cross section.

Referring to the drawings, numeral 10 represents a switch system made in accordance with the invention comprising a first housing member 12 formed with a recess 14 therein and closed by a second housing member or lid 13. With particular reference to FIGS. 1 and 2, switch system 10 is provided with a connector portion 16 having a connector shroud 16a, generally cylindrical in configuration, and having a longitudinal axis 18 and a manual lever shaft receiving bore 32b having a longitudinal axis 22. Axes 18 and 22 are generally parallel with one another and are spaced from one another a precise distance $a$ selected to be essentially the same as the distance $a'$ between the longitudinal axes of bores 2, 4 respectively of wall 6 of a vehicle transmission housing, as will be explained below.

Figure 3:
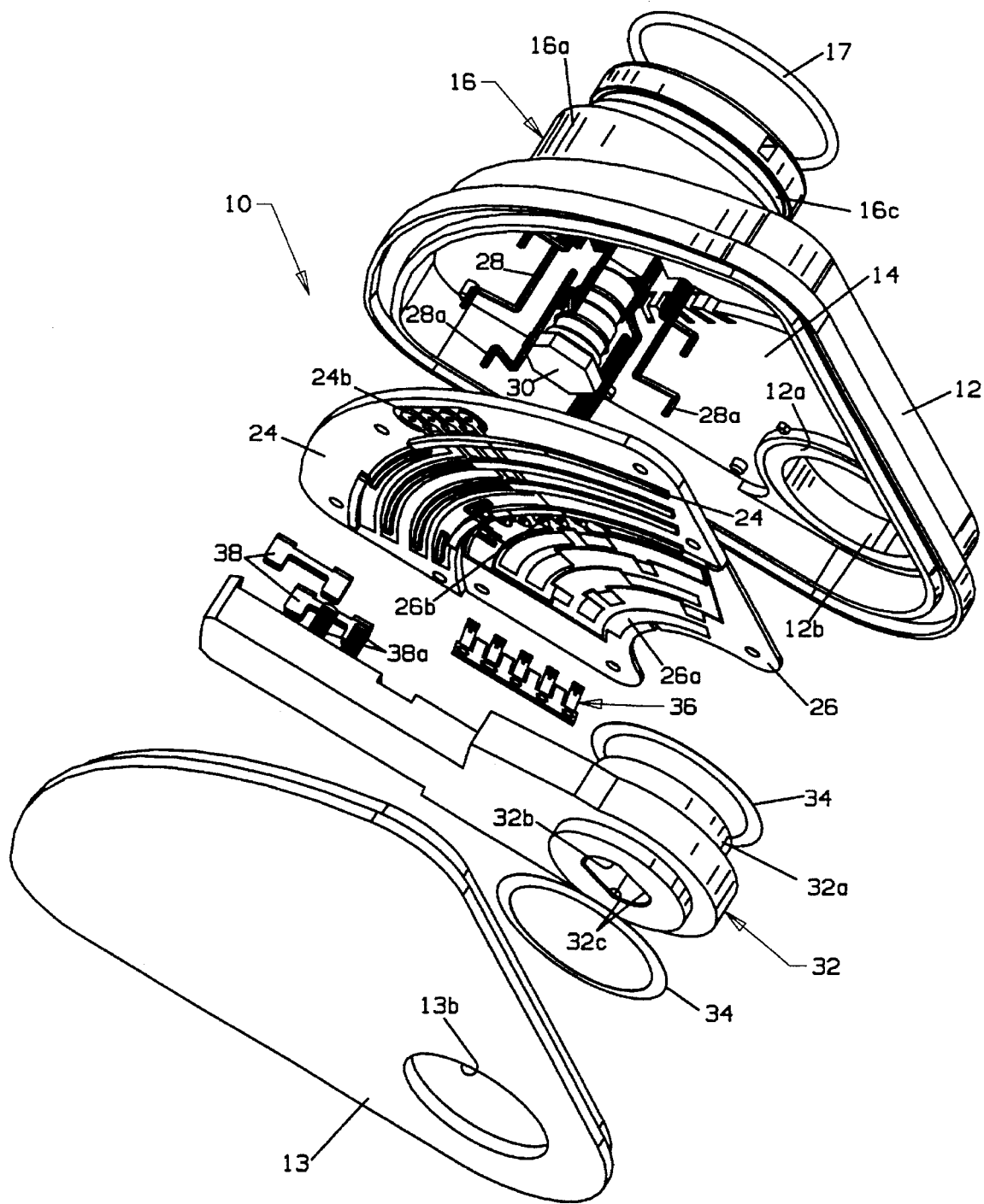
FIG. 3 is an exploded view of the FIG. 1 switch assembly.
Figure 4:
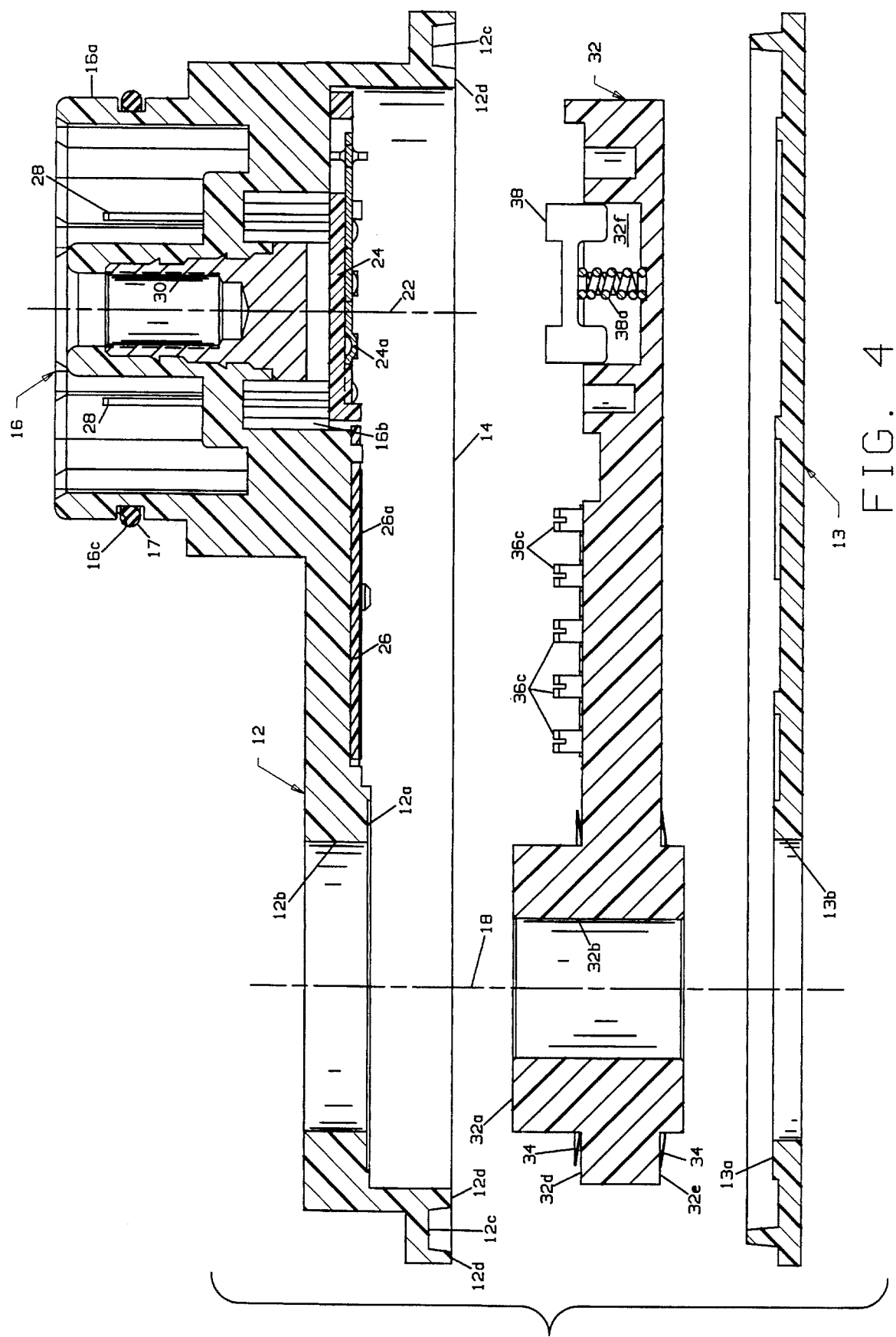
FIG. 4 is a cross sectional view of the FIG. 1 switch assembly taken prior to welding the housing and lid together and with the housing and lid separated from one another and from the actuator arm for purpose of illustration.

As best seen in FIGS. 3 and 4, a high current circuit board 24 and a low current circuit board 26 are mounted in cavity 14 of housing member 12. The circuit boards have arcuate shaped contact segments 24a, 26a respectively disposed on the bottom surface thereof as viewed in the figures, which in turn are connected to terminal pads 24b, 26b respectively. Preferably, the circuit boards are each formed from a single lead frame insert molded in a suitable electrically insulative polymer with individual circuit segments separated after molding by severing bridging runners in a known manner. Terminal pins 28 are mounted in connector portion 16, preferably by insert molding, and have lower distal end portions 28a extending into a connector recess 16b of connector portion 16. Distal end portions 28a are received in apertures formed in circuit boards 24, 26 in alignment with terminal pads 24b, 26b respectively and are connected thereto by suitable means, such as soldering. A generally tubular insert 30 having a closed end and formed of suitable material such as brass is also insert molded in connector 16 and is provided with a threaded bore to cooperate with a mating connector 16d shown in dashed lines in FIG. 2 received outside the transmission housing. A suitable annular groove 16c is preferably provided about the outer periphery of connector 16 to serve as an O-ring seat for a suitable O-ring 17.

An actuator arm 32 has a hub 32a formed with a bore 32b having suitable key means to maintain a selected angular orientation with a shaft received in the bore. As shown, bore 32b is provided with a pair of opposed flat surfaces 32c to serve this function so that the actuator arm will maintain a given angular orientation relative to a manual lever shaft having corresponding flat surfaces received in the bore.

As best seen in FIG. 4, a first annular seat of opposed surfaces, being spaced apart by a selected distance when assembled, is formed between annular surface portion 32d of actuator arm 32 around the periphery of hub 32a and the bottom annular surface 12a of housing member 12 about the periphery of bore 12b which receives the top portion of hub 32a. A second annular seat of opposed surfaces, being spaced apart by a selected distance when assembled, is formed on the opposite side of actuator arm 32 between surface portion 32e around the periphery of hub 32a and the top surface 13a of lid member 13 about the periphery of bore 13b which receives the bottom portion of hub 32a.

Figure 7:
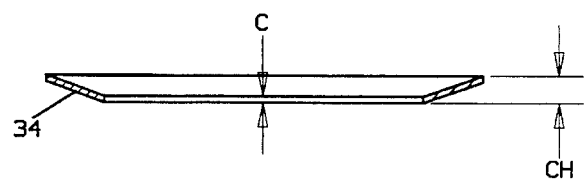
FIG. 7 is a cross sectional view of a spring sealing element used in the FIG. 1 switch assembly.

First and second annular spring sealing elements 34 are disposed at the respective first and second seats. Seal elements 34 are sloped or curved in the radial direction and have a crown height between at least one of the inner and outer edges lying in a plane to that portion of the elements furthest removed from the plane, i.e., distance ch in FIG. 7. Sealing elements of this type are also disclosed in pending application Ser. No. 176,753, assigned to the assignee of the present invention.

Figure 8:
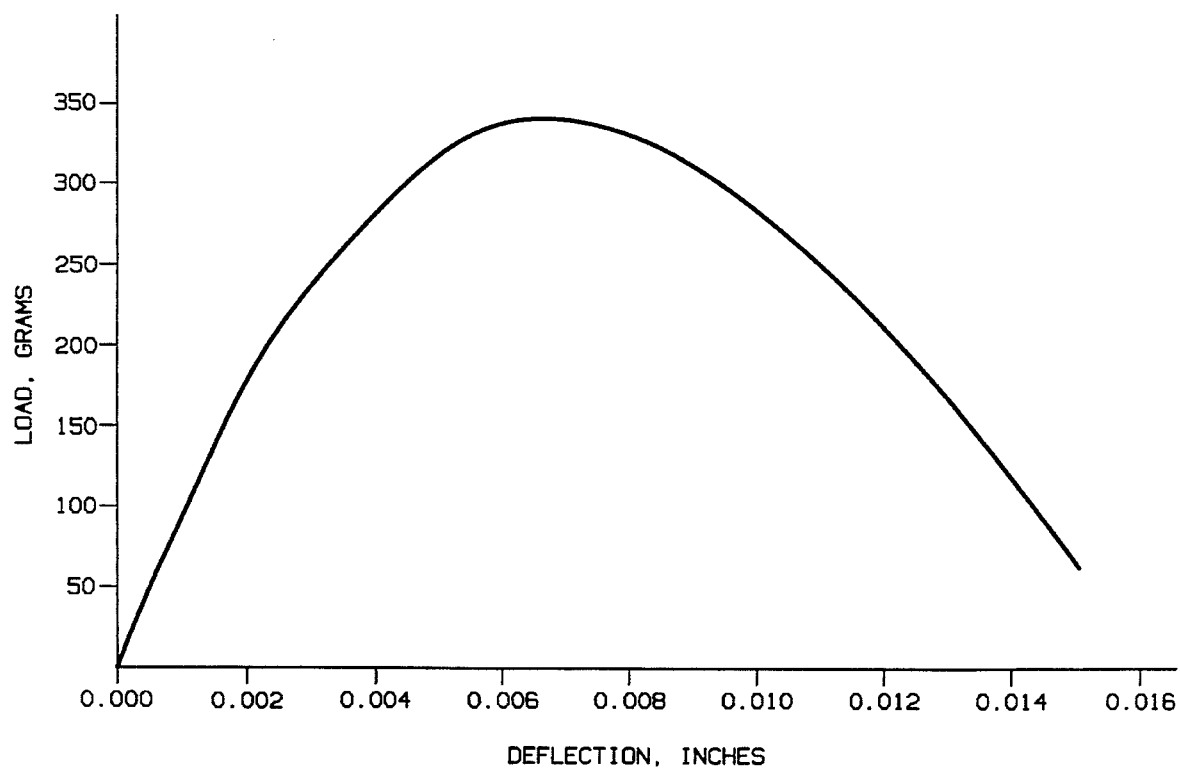
FIG. 8 is a graph of load vs. deflection of the FIG. 7 spring sealing element.

While any spring sealing element curved in the radial direction can be used to effectively prevent ingress of debris a particularly suitable element has a load deflection curve in which load decreases as the spring is collapsed as it approaches a flat configuration. An example of this type of spring is one type of a so-called Belleville spring washer. By way of example, as seen in FIG. 8, deflection of the spring element having a thickness t of 0.003 inches and a crown height ch of 0.015, by placing a load on the element, results in increasing force as the deflection commences and then after a zenith at slightly less than half of the total deflection to a flat configuration, the force decreases with increasing deflection. By forming a seal element seat in which the opposed surfaces are spaced apart by a vertical dimension selected so that the seal element will be deflected between the zenith of the force vs. deflection curve and the flat configuration, preferably, slightly prior to the flat configuration, a system results in which the sealing function is provided yet which produces very little drag when moving actuator arm 32. For example, for a sealing element 34 having a thickness t of 0.076 inches and a crown height ch of 0.432/0.482, a vertical gap for the seat of 0.150 would provide a suitable low drag seal.

Figure 5:
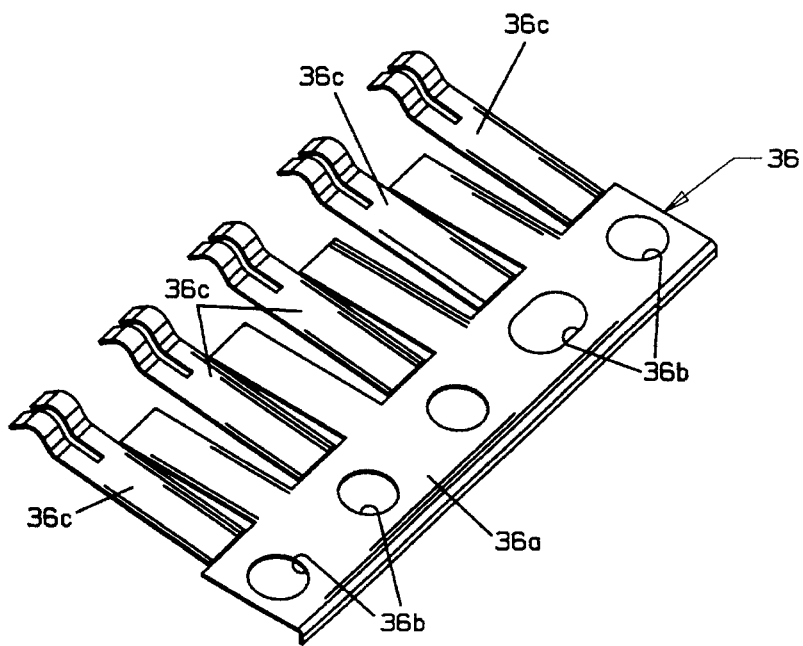
FIG. 5 is a perspective view of a movable contact assembly used in the FIG. 1 assembly.
Figure 6:
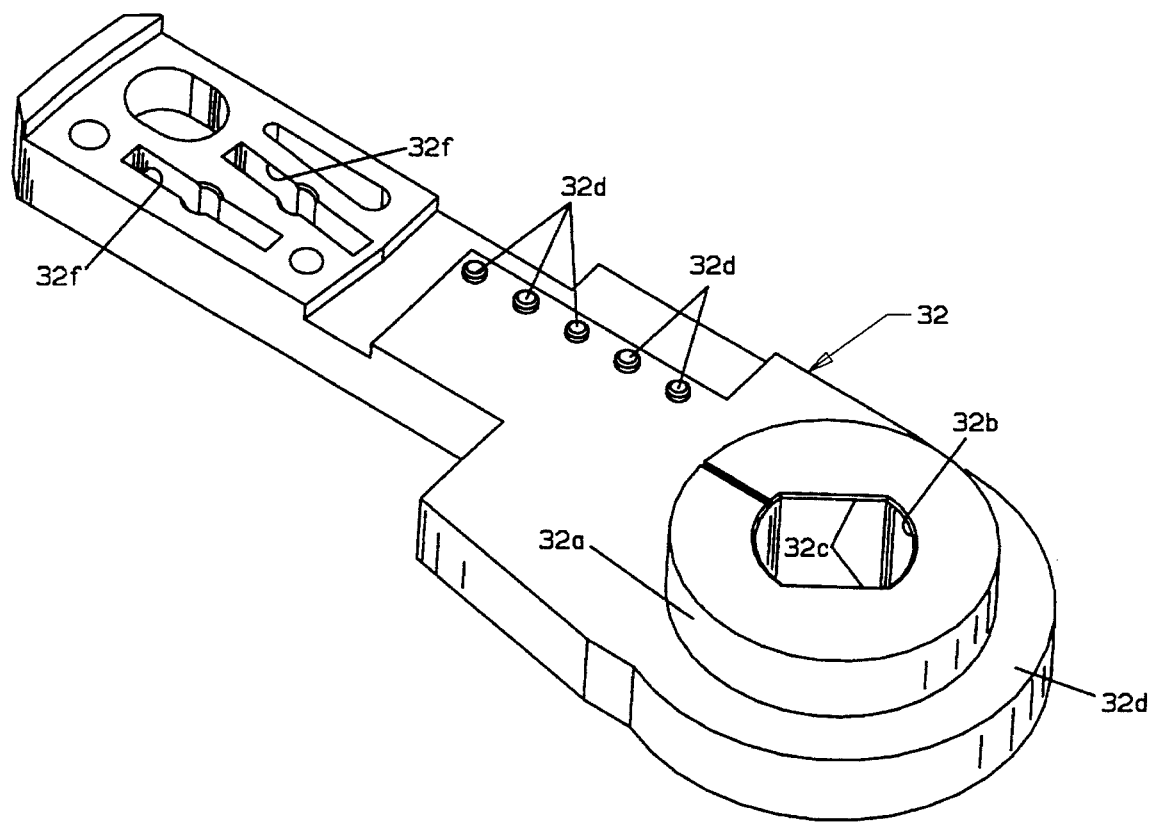
FIG. 6 is a perspective view of an actuator arm used in the FIG. 1 assembly.

As seen in FIG. 6, actuator arm 32 is provided with alignment and staking protrusions 32d on which is received low current spring contact member 36 (FIG. 5) which comprises a base portion 36a having a plurality of apertures 36b which receive protrusions 32d and a plurality of contact fingers 36c each of which having a distal end portion adapted to be biased against circuit board 26 so that the free distal end portions will slide into and out of engagement with respective contact segments 26a as actuator arm 32 is pivoted.

Actuator 32 is also provided with high current contact seats 32f which received generally U-shaped contact elements 38 (FIG. 3) which are each biased by a respective coil spring 38a into engagement with circuit board 24 so that the contacts will slide into and out of engagement with respective contact segments 24a as actuator arm 32 is pivoted.

Housing member 12 and lid 13 are preferably composed of suitable electrically insulative material such as a moldable polymer. According to a feature of the invention, the housing and cover are preferably formed of thermoplastic material such as nylon and are vibration welded together. Seal elements 34 accommodate the lateral vibratory motion of the vibration welding process which would not be possible if conventional gasket type seals were used. Bore 13b of lid 13 is made sufficiently large so that during vibration welding approximately 1 mm of lateral motion can be accommodated without bore 13b contacting the actuator hub diameter 32a on the lid side. Housing member 12 is provided with a circumferential channel 12c along its outer perimeter opening downwardly as seen in FIG. 4 while cover 13 is provided with a circumferential lip 13c along its outer perimeter extending upwardly as seen in the figures. The volume of channel 12c is selected to be at least as large as the volume occupied by lip 13c so that as the lip liquefies due to the vibratory energy the material will be contained within the channel and lid 3 will be flush with surfaces 12d of housing member 12 around the periphery of the housing to provide known selected dimensional relationships within recess 14, e.g., to provide the selected distance between the respective seal element seating surfaces.

The provision of spring seal elements 34 not only make it possible to weld the parts together using vibratory energy, it also makes it possible to accommodate the switch assembly to two fixed bores in the wall of the transmission housing and still provide a sealing function to prevent ingress of debris and the like. That is, bores 2 and 4 can be machined in sidewall 6 a selected distance a' from each other within a manufacturing tolerance within which seal elements can adjust due to their ability to be moved sideways in the seating area.

The center lines of bore 2 and manual shaft 8 are determined by transmission and vehicle design requirements. The switch assembly is then designed to be mounted on the manual lever shaft 8 with connector portion 16 located such that it is receivable in bore 2 with the electrical contacts placed in the correct relative angular position. The ability to adjust the switch dimension a to the transmission bores dimension a', or more properly to the dimension between the longitudinal axes of bore 2 and manual shaft 8, by having the actuator hub 32a move within bore 12b of housing 12 allows the switch assembly to be installed in the transmission.

Improved angular control of the orientation of the housing with respect to relevant transmission datums, i.e., the center lines of manual shaft 8 and bore 2, can be obtained by making the diameter of bore 12b slightly smaller relative to hub 32a while at the same time, as seen in dashed lines in FIG. 1, elongating the bore to form a slot along a line extending between axes 18 and 22 so that the seal elements can adjust to a position along a line established between the centers of bore 2 and manual lever shaft 8. The outer diameter of sealing member 34 determines the amount of adjustment along that line which can be accommodated without adversely affecting the sealing function.

It should be understood that although the preferred embodiment of the invention has been described in order to illustrate the invention, the invention includes various modifications and equivalents to the disclosed embodiment. For example, in certain applications it may not be necessary to employ seal elements 34 in switch assembly 10. Further, although the connector portion 16 in the disclosed embodiments has a longitudinal axis parallel with that of manual shaft 8, it is within the purview of the invention to relate manual shaft 8 to some other reference in the switch housing and the manual valve position, for example, where the connector portion extends from the housing at some angle wherein the longitudinal axes are not parallel with one another. The slot extending along a line established between the selected reference in the switch housing and the designed position of the longitudinal axis of the manual lever shaft can still be utilized in fitting the switch to the transmission housing bores without having to rely on the detent roller to establish the proper alignment. It is intended that the invention include all modifications and equivalents falling within the scope of the appended claims.

What is claimed:

1. A switch system for use with motor vehicle transmission apparatus having a pivotably mounted manual lever shaft mounted in a transmission housing comprising a switch housing, the switch housing formed with an aperture and with a connector portion having a generally cylindrical connector shroud extending from the housing, a terminal recess formed in the connector portion, terminal pins mounted in the connector portion and extending into the terminal recess, an actuator arm having a hub, the hub received in the switch housing aperture with first and second annular seal element seating surfaces on opposed upper and lower sides of the arm around the hub, each surface lying in a respective first and second plane, the housing having third and fourth annular seal element seating surfaces each lying in a respective third and fourth plane, the first and third planes being parallel with one another and the first and third seating surfaces being in alignment with one another and spaced apart a selected distance, the second and fourth planes being parallel with one another and the second and fourth seating surfaces being aligned with one another and spaced apart a selected distance, a manual lever shaft receiving bore formed through the hub, and means to maintain a given angular orientation of the actuator arm relative to the manual level shaft when the manual lever shaft is received in the manual lever shaft receiving bore, a first annular belleville type spring seal element formed of material having a given thickness received between the first and third seating surfaces and a second belleville type annular spring seal element formed of material having a given thickness received between the second and fourth seating surfaces, each annular spring seal element having an inner and an outer peripheral edge, at least one peripheral edge lying in a plane, each annular spring seal element having a surface portion curved in a radial direction and having a crown height measured from the surface portion furthest removed from the plane in which the at least one edge lies in the at rest condition, the selected distance between the first and third seating surfaces and the second and fourth seating surfaces being more than the given thickness and less than the crown height of the respective first and second annular spring seal elements thereby forming a pressure contact seal between respective seat surfaces, a plurality of electrical contact segments mounted in the housing, and spring biased contact members mounted on the actuator arm and being slidable into and out of electrical engagement with selected contact segments of the plurality of electrical contact segments as the manual lever shaft is pivoted, the contact segments being electrically connected to respective terminal pins.

2. A switch system according to claim 1 in which the annular spring seal elements have a selected crown height when not subjected to force and have a generally bell shaped load vs. deflection curve in which deflection increases as a load is applied causing deflection of the elements in the direction of decreasing the height until a point intermediate the crown height and a flat configuration and then decreases as the deflection goes from the intermediate point toward the flat configuration.

3. A switch system according to claim 2 in which the selected distance between the first and third seating surfaces and the second and fourth seating surface is such that deflection of the spring seal elements is between the intermediate point and the flat configuration.

4. A switch system according to claim 1 in which the selected distance between the first and third seating surfaces and the second and fourth seating surfaces is slightly greater than the said given thickness and substantially less than the said crown height.

5. A switch system according to claim 1 in which the seating surfaces have an outside diameter larger than the diameter of the outer edge of the annular spring seal elements by a selected distance to permit lateral shifting of the actuator arm relative to the housing to accommodate misalignment of the manual lever shaft relative to a bore in the transmission housing wall receiving the connector shroud.

6. A switch system according to claim 1 in which the housing comprises first and second housing members, a downwardly opening channel formed around the outer periphery of the first housing member, a lip extending upwardly around the outer periphery of the second housing member and being receivable in the channel, the channel having a volume at least as large as the volume of the lip, the housing formed of thermoplastic material and the seating surfaces having an outside diameter larger than the diameter of the outer edge of the annular seal elements by a selected distance to permit lateral movement of the first and second housing members during an ultrasonic welding procedure to fix the housing members together.

7. A switch system according to claim 1 in which the cylindrical connector shroud and the manual lever shaft receiving bore have longitudinal axes which extend parallel with one another.

8. A switch system according to claim 7 in which the switch housing aperture is generally circular in configuration.

9. A switch system according to claim 7 in which the switch housing aperture is elongated in a direction toward the longitudinal axis of the cylindrical connector shroud.

10. A switch system for use with motor vehicle apparatus having a pivotably mounted manual level shaft, comprising a transmission housing wall having first and second bores spaced a selected distance from one another within a manufacturing tolerance, the first bore being located at a selected angular position relative to the second bore and to relevant transmission datums, a switch housing having a generally cylindrical connector portion extending through the first bore of the transmission housing wall, a manual lever shaft receiving aperture extending through the witch housing, a manual lever shaft received in the manual lever shaft receiving aperture and extending through the second bore of the transmission housing wall, an actuator arm having a bore in which the manual lever shaft is received, the actuator arm extending into the switch housing and seal means disposed between the actuator arm and the switch housing comprising at least one annular spring sealing element of the belleville type movable laterally relative to the switch housing a distance up to the manufacturing tolerance to thereby provide a pressure contact seal.

11. A switch system according to claim 10 in which the annular spring element has a selected crown height when not subjected to force and has a generally bell shaped load vs. deflection curve in which deflection increases as a load is applied causing deflection of the element in the direction of decreasing the height until a point intermediate the crown height and a flat configuration and then decreases as the deflection goes from the intermediate point toward the flat configuration.

12. A switch system according to claim 10 in which said at least one annular spring element is formed of material having a given thickness and having an inner and outer peripheral edge, at least one peripheral edge lying in a plane, the spring element having a surface portion curved in a radial direction and having a crown height measured from the surface portion furthest removed from the plane in which the at least one edge lies in the at rest condition, an annular sealing element seating surface formed on the actuator arm and a cooperating annular sealing element seating surface formed on the housing, the annular sealing element seating surface on the actuator arm being generally aligned with and spaced apart from the annular sealing element seating surface of the housing a selected distance more than the given thickness and less than the crown height.

13. A switch system according to claim 12 in which the selected distance between the seating surfaces is slightly greater than the said given thickness and substantially less than the said crown height.

14. A switch system according to claim 12 in which the switch housing comprises first and second members, a downwardly opening channel formed around the outer periphery of the first housing member, a lip extending upwardly around the outer periphery of the second housing member and being receivable in the channel, the channel having a volume at least as large as the volume of the lip, the housing formed of thermoplastic material and the seating surfaces having an outside diameter larger than the diameter of the outer edge of the annular seal element by a selected distance to permit lateral movement of the first and second housing members during a vibration welding procedure to fix the housing members together.

15. A switch system according to claim 14 in which the cylindrical connector portion and the actuating arm bore have longitudinal axes which extend parallel with one another.

16. A switch system according to claim 14 in which the actuator arm has an upper surface and a lower surface and the seal means comprises first and second annular sealing elements, the first annular sealing element received between the upper surface of the actuator arm and a switch housing wall and the second annular sealing element between the lower surface of the actuator arm and a switch housing wall.

17. A switch system according to claim 14 in which the manual lever shaft receiving aperture is formed as a slot extending along a line established between the center lines of the cylindrical connector portion and the manual lever shaft receiving aperture.

18. A switch system for use with motor vehicle apparatus having a pivotably mounted manual lever shaft, comprising a transmission housing wall having first and second bores spaced within a manufacturing tolerance a selected distance from one another and at a selected angular position relative to one another and to relevant transmission datums including the designed position of the manual lever shaft, a switch housing having a connector portion received through the first bore of the transmission housing wall, a manual lever shaft receiving bore having a longitudinal axis extending through the switch housing, a plurality of stationary electrical contacts mounted in the housing at a selected angular orientation relative to a reference location of a portion of the switch housing and the manual lever shaft receiving bore and at a selected distance from the reference location and the axis of the manual lever shaft receiving bore, a manual lever shaft received in the second bore of the transmission housing wall, and an actuator arm mounting a plurality of electrical contacts thereon mounted on the manual lever shaft to rotate therewith and extending into the switch housing and positioned to move into and out of engagement with the stationary electrical contacts as the manual lever shaft rotates, the actuator arm having a hub received in the manual shaft receiving bore, the manual shaft receiving bore formed in the shape of a slot having a width within a manufacturing tolerance just large enough to form a rotating fit with the hub, the slot being elongated along a line established between the reference location and the designed position of the longitudinal axis of the manual lever shaft.

19. A switch system for use with motor vehicle apparatus according to claim 18 in which the connector portion is generally cylindrical having a longitudinal axis and the reference location of a portion of the switch housing is the longitudinal axis of the connector portion.

* * * * *